United States Patent [19]

Harrison et al.

[11] Patent Number: 6,151,623

[45] Date of Patent: Nov. 21, 2000

[54] AGENT ACTIVITY REPORT VIA OBJECT EMBEDDING

[75] Inventors: Colin George Harrison, Brookfield, Conn.; Richard Spagna, Boca Raton; Sueann Nichols, Lantana, both of Fla.

[73] Assignee: International Business Machines Corporation, Armonk, N.Y.

[21] Appl. No.: 08/766,523

[22] Filed: Dec. 13, 1996

[51] Int. Cl.[7] .................................................. G06F 17/30
[52] U.S. Cl. ..................... 709/206; 709/201; 709/202; 709/203; 709/206; 709/212; 709/228; 709/242; 709/244; 707/511; 345/329; 358/402; 340/825.31
[58] Field of Search ................................ 395/200.36, 683, 395/200.32, 200.35, 288.01; 706/45; 709/242, 201, 202, 206, 212, 228, 274; 345/329; 358/402; 455/26.1; 340/825.31; 707/511

[56] References Cited

U.S. PATENT DOCUMENTS

| | | |
|---|---|---|
| 5,181,162 | 1/1993 | Smith et al. . |
| 5,283,856 | 2/1994 | Gross et al. ............................... 395/51 |
| 5,297,283 | 3/1994 | Kelly et al. . |
| 5,404,503 | 4/1995 | Hill et al. . |
| 5,421,012 | 5/1995 | Khoys et al. . |
| 5,423,043 | 6/1995 | Fitzpatrick et al. ..................... 395/683 |
| 5,453,933 | 9/1995 | Wright et al. . |
| 5,469,562 | 11/1995 | Saether . |
| 5,481,699 | 1/1996 | Saether . |
| 5,493,692 | 2/1996 | Theimer et al. .................... 340/825.31 |
| 5,701,484 | 12/1997 | Artsy ................................... 395/200.32 |
| 5,767,847 | 6/1998 | Mori et al. ............................... 345/329 |
| 5,862,325 | 1/1999 | Reed et al. .......................... 395/200.31 |

OTHER PUBLICATIONS

IBM Technical Disclosure Bulletin—vol. 37 No. 09, Sep. 1994 (two pages).

*Primary Examiner*—Dung C. Dinh
*Assistant Examiner*—Hieu C. Le
*Attorney, Agent, or Firm*—Steven J. Meyers; Steven J. Soucar, Fleit, Kain, Gibbons, Gutman & Bongini P.L.

[57] ABSTRACT

A software intelligent Agent, and rules provided thereto by a user, screen and process data objects, for example an e-mail message, in accordance with said rules. Actions taken by the Agent to process a data object in accordance with rules associated with the object are entered into an activity record and the activity record is injected into the body of the data object, for example pre-pended into an e-mail message as the first body part of the message. This obviates the need for a user to remember the rules or to remember what actions were taken by the Agent.

10 Claims, 5 Drawing Sheets

AGENT ACTIVITY REPORT VIA OBJECT EMBEDDING

BACKGROUND OF THE INVENTION

1. Field of the Invention

This invention relates generally to the use of software agents (Agents) in data processing systems to create and manage associations or links among devices, objects, attributes, or actions; and more particularly, to attaching to an object that is routed to an Agent for processing a record of what the Agent automatically did with the object on behalf of the owner of the Agent in accordance with rules provided by the owner to the Agent.

2. Description of the Prior Art

The office environment has witnessed a quiet technological revolution. Personal computers (PCs), facsimile (fax) machines, voice mail, electronic mail (e-mail), conferencing, desktop publishing, and other tools have changed the workplace forever. As data and devices proliferate, tasks like organizing information, locating files, and securing enough disk space gets increasingly difficult. Users performing routine office tasks are forced to search for data objects and information associated with a given action.

Various desktop management techniques have evolved in the form of software agents ("Agents") to address the association of actions with objects. These software Agents may be used to filter information and prioritize messages, create and distribute business forms, and make videos of screen activities for training and presentations. These software Agents attempt to replicate the actions of people doing information delivery tasks. The software Agents, acting on behalf of the user, execute application workflows and interact with computer applications and phone and fax resources to perform transactions typically requiring human intervention.

Still other desktop management techniques have employed the concepts of user control linking (e.g., Object Linking & Embedding (OLE), Dynamic Data Exchange (DDE)). These techniques allow the user to pass data represented by a control to other applications that are invoked via a linking program controlling linking, to integrate at execution time applications that are totally unaware of each other.

U.S. Pat. No. 5,423,043, issued Jun. 6, 1995 to Fitzpatrick et al. and assigned to the assignee of this application, describes a procedure for managing the creation and monitoring of an arbitrary number of devices, objects, attributes, or actions on a computer's desktop.

It describes a method and apparatus to associate actions, attributes, objects, or devices on a computer desktop to reduce multiple manual processes. A media association Agent is provided to monitor, build, maintain, and recall links based on prior actions and user choices. The media association Agent exists within a data processing system as a background or windowed activity, and implemented in one embodiment as a terminate-and-stay-resident (TSR) process. Devices, attributes, objects, and actions are registered by the media association Agent and stored in non-volatile storage. Associations are then built by links among the entities registered with the media association Agent. These links take the form of entries in relational database tables, entries in flat files, linked lists, sets of pointers, etc. The groups of links are assigned unique identifiers for internal use by the media association Agent.

The media association Agent may act continuously to record actions and build links passively or on demand based on user specific user signals such as a trigger.

This U.S. Pat. No. 5,423,043 is hereby incorporated herein by reference as if it were set forth herein in its entirety.

The use of media association Agents and rules for screening and routine handling of objects, for example with e-mail, is becoming more and more prevalent. There has, however, been some reluctance on the part of individuals to incorporate this advanced technology. One of the reasons is that it becomes difficult for a user to remember what he or she told the Agent or rules to do.

cc:Mail from Lotus does have rules based processing for its subscribers' mail. Notification of this rules processing can be sent to the subscribers' display. This has the limitation that only activities that are performed for the subscriber while they are connected to the cc:Mail service are seen. Therefore, a subscriber to cc:Mail will have to retain this information in their head. A further shortcoming of cc:Mail is that if a mail item is handled by cc:Mail for a subscriber while the subscriber is not attached to the server, the subscriber never knows that something was done on their behalf to the mail.

IntelliAgent, marketed by IBM as a standalone tool, solves the problem of a subscriber having to remember what was done to their mail by providing an Activity Log. Any actions that the IntelliAgent performs are logged. The shortcoming here is that an individual would have to bring up the log to determine what actions IntelliAgent had performed on a mail message for them (so they would not potentially duplicate any actions).

Accordingly, it is a primary object of the present invention to provide an improved method and means for obviating the need for a user to remember the rules provided to his Agent or the actions taken by the Agent during processing of an object on behalf of the user.

SUMMARY OF THE INVENTION

The above and other objects of the invention are achieved by providing, in each object routed to an Agent for processing, member data that contains an Agent activity record or a collection of Agent activity records. In this manner, the Agent attaches to the processed object itself a record of what it did with the object on behalf of its owner.

In one preferred implementation, the invention is advantageously used in mail handling in a network of client/server units that offer automation of e-mail. The Agent in a server unit would append to the mail any activities the Agent and/or rules have taken on the user's behalf. For example, if the user has a rule that states forward a copy on to Mary, then the Agent would append into the mail item a statement that says when the mail was received, which rule caused action to be taken, and what action was taken. This appending would be accomplished by generating a body part and inserting it into the mail as a body part. By pre-pending it, the user would first see any activity the Agent did on his behalf. This would be before he even saw the contents of the mail. This will save people from embarrassing situations ("You already forwarded me this mail, why are you doing it again?") and will reduce the load on the network by not having the same mail item sent to the same individual multiple times.

This assumes that one is programming in the known Object Oriented domain. In this domain, objects are instantiations of classes that encapsulate function and data. Inheritance plays a part in that one class can inherit function and data from another class. Any class object passed to an Agent inherits from an Agent activity class that contains as member data a collection of Agent activity records. In addition, methods would be provided by the Agent activity class to add records and to retrieve records. If one were not programming in the Object Oriented domain, other known structures can be used to accomplish the same effect.

Thus, the improved method and means alleviates users from the need to remember what actions their Agents actually took for them by placing a record of those actions in the objects that the Agents processed. The record is contained within the object for all time and is available for review at any time. There is no need to bring up other applications to determine if any action was taken on their behalf against an object because the information is embedded in the object under question. This enhances the useability of Agents.

In accordance with these and other objects which will become apparent hereinafter, the instant invention will now be described with particular reference to the accompanying drawings.

DESCRIPTION OF THE PREFERRED EMBODIMENTS

Figure 1:
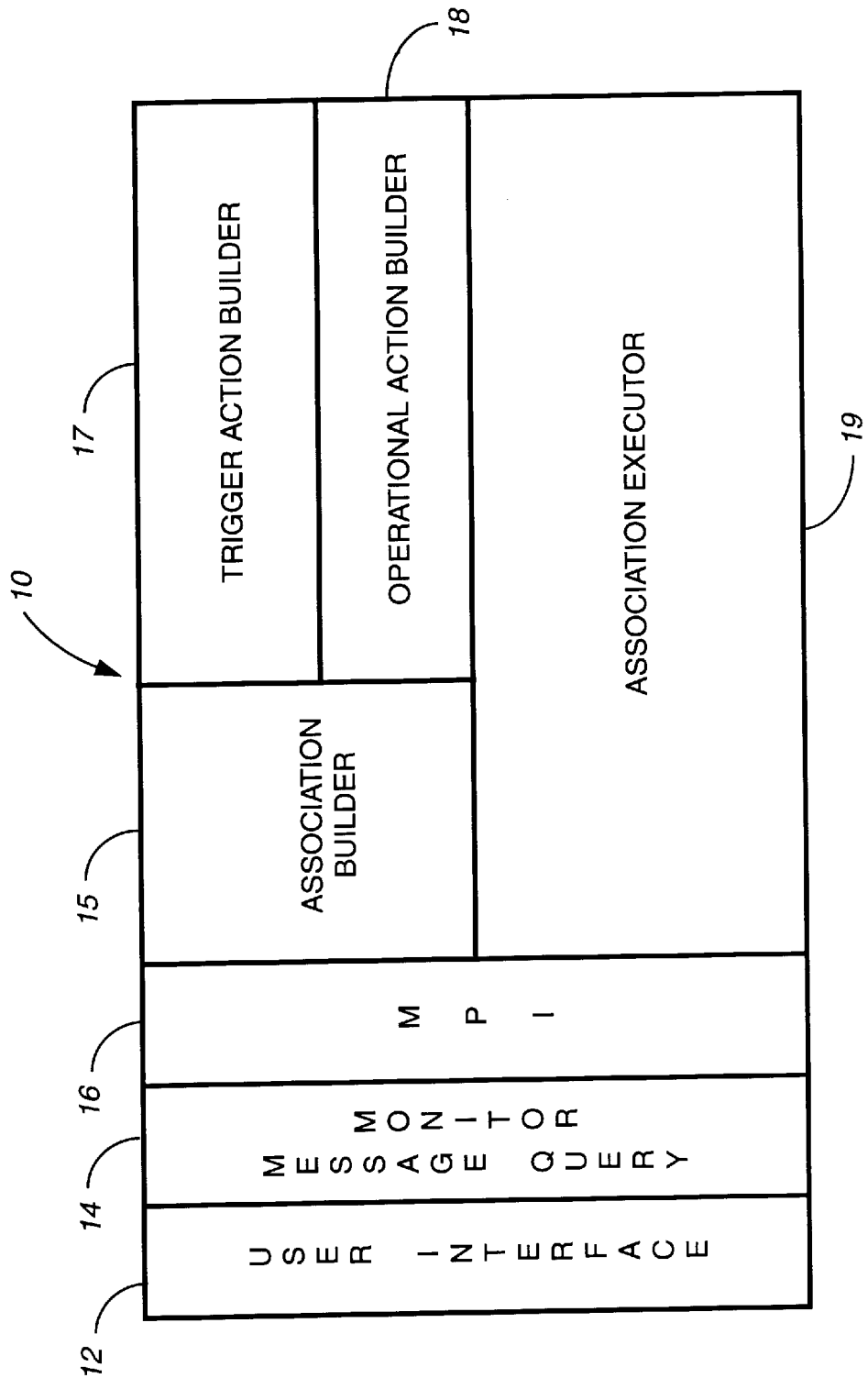
FIG. 1 illustrates a prior art block diagram of a media association agent (Agent) embodied in a stand-alone uniprocessor environment.

FIG. 1 illustrates the prior art Media Association Agent (Agent) 10 of the above-identified U.S. Pat. No. 5,423,043 which monitors, builds, maintains, and recalls links among attributes, devices, objects, and actions in a uniprocessor-type environment. Said patent describes in detail a method and means for building associations and retrieving associated actions. The Agent 10 creates/maintains a table of actions. It describes how a user may, via prompts, indicate which events are deemed triggering events and which are operational actions. Each table entry (record) contains a field like "action type" whose value may be "trigger" or "operation."

An operation is an action committed as the result of a trigger. A trigger, in contrast, is an action potentially resulting in the commission of other actions. The Agent 10 contains a Media Programming Interface (MPI) 16 which interfaces with the attributes, devices, objects, and actions to permit monitoring different routine office tasks. The Agent 10 also contains an association builder 15 wich builds associations among the various entities.

The Agent 10 contains a user interface 12 which permits the user to observe and modify operations within the Agent 10. The message queue monitor (MQM) 14 oversees message interchange when office tasks are executed. The association executor 19 executes the Agent 10 associations created by the association builder 15. The trigger action builder 17 and operational action builder 18 allow a user to specify which actions are to be interpreted as triggers or operations associated with a given trigger or triggers.

A user is also provided the capability to specify operational actions so that the Agent 10 can differentiate between actions that may be executed (e.g., operations) or actions to be used as trigger events.

The present invention may be implemented in the uniprocessor environment described in said patent by providing an additional method and means for embedding a summary of actions taken automatically by the intelligent Agent on an object into that object as a history trail when the object is routed to the Agent for processing. For example, if a data object is routed to an Agent for processing and is thereafter automatically filed by the Agent into a plurality of files, a record of the receiving files can be injected into the data object prior to filing.

A preferred embodiment of the invention uses by way of example mail handling by an Agent for its owner. The standard today for mail is Multipurpose Internet Mail Extension (MIME), described below.

Figure 2:
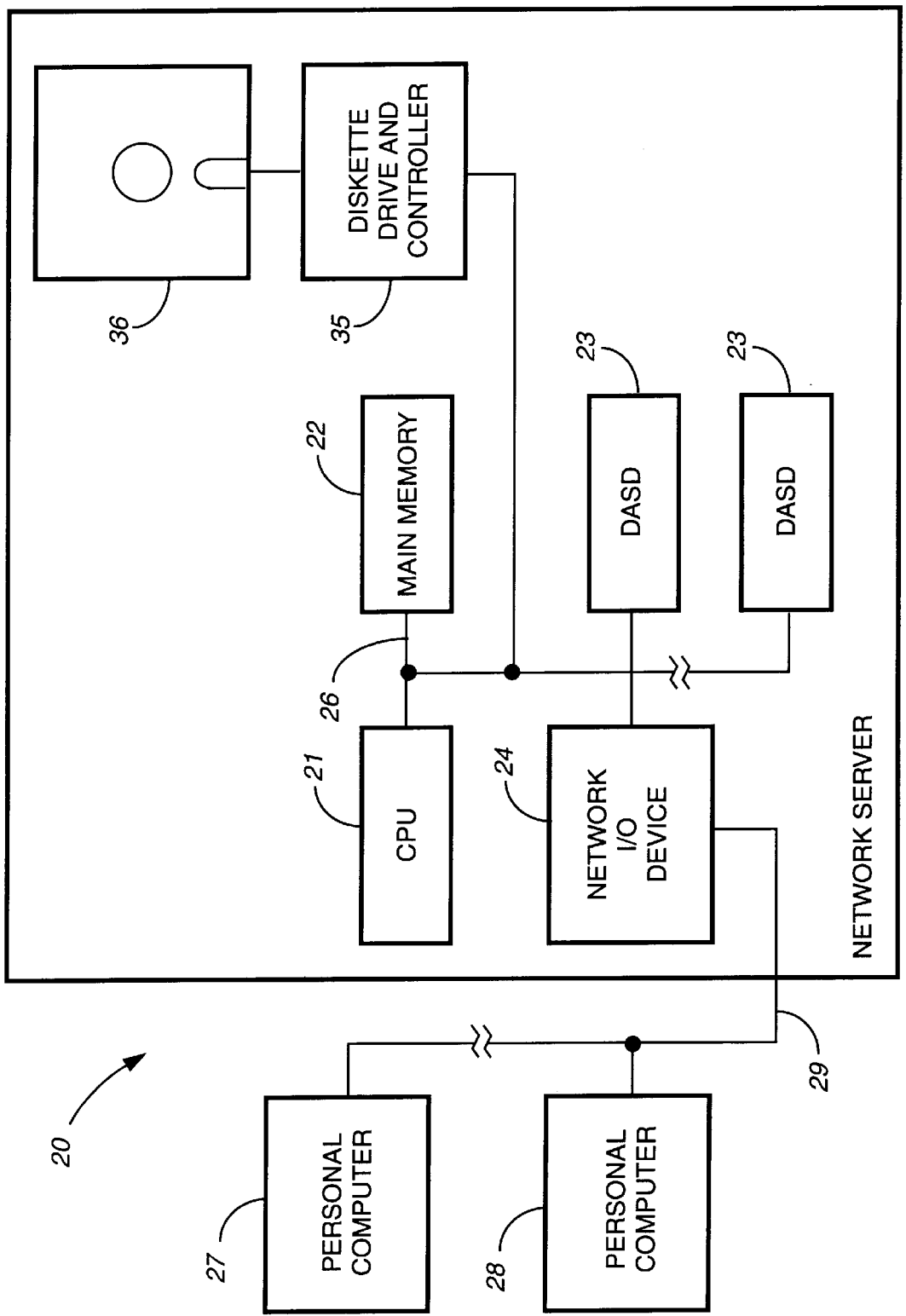
FIG. 2 is a block diagram illustrating a client/server network in its simplest form.

However, in a preferred embodiment, a specific implementation involves mail handling by an Agent for its owner in a client/server network, illustrated diagrammatically in FIG. 2. Client/server networks are well known in the art and FIG. 2 illustrates such a network in its simplest form.

A network server 20 includes at least one central processing unit (CPU) 21 coupled to a main memory 22, one or more direct access storage devices (DASD) 23, and at least one network input/output (I/O) device 24 by a bus 26. The server 20 also includes a diskette drive 35 and diskette 36 for loading the program component of FIG. 3 into the server 20 and client units 27, 28.

The network I/O device 24 couples the server 20 to a plurality of client units, such as personal computer units (PC) 27, 28, via a network communication line 29.

E-Mail messages may be sent between PC 27 and PC 28 via the server 20 and line 29 in a manner well known in the art.

In FIG. 2, each PC unit 27 and 28 may be a conventional unit having a CPU, memory, keyboard, display, floppy disk, hard disk, and I/O communications port (not shown), well known in the art.

Figure 3:
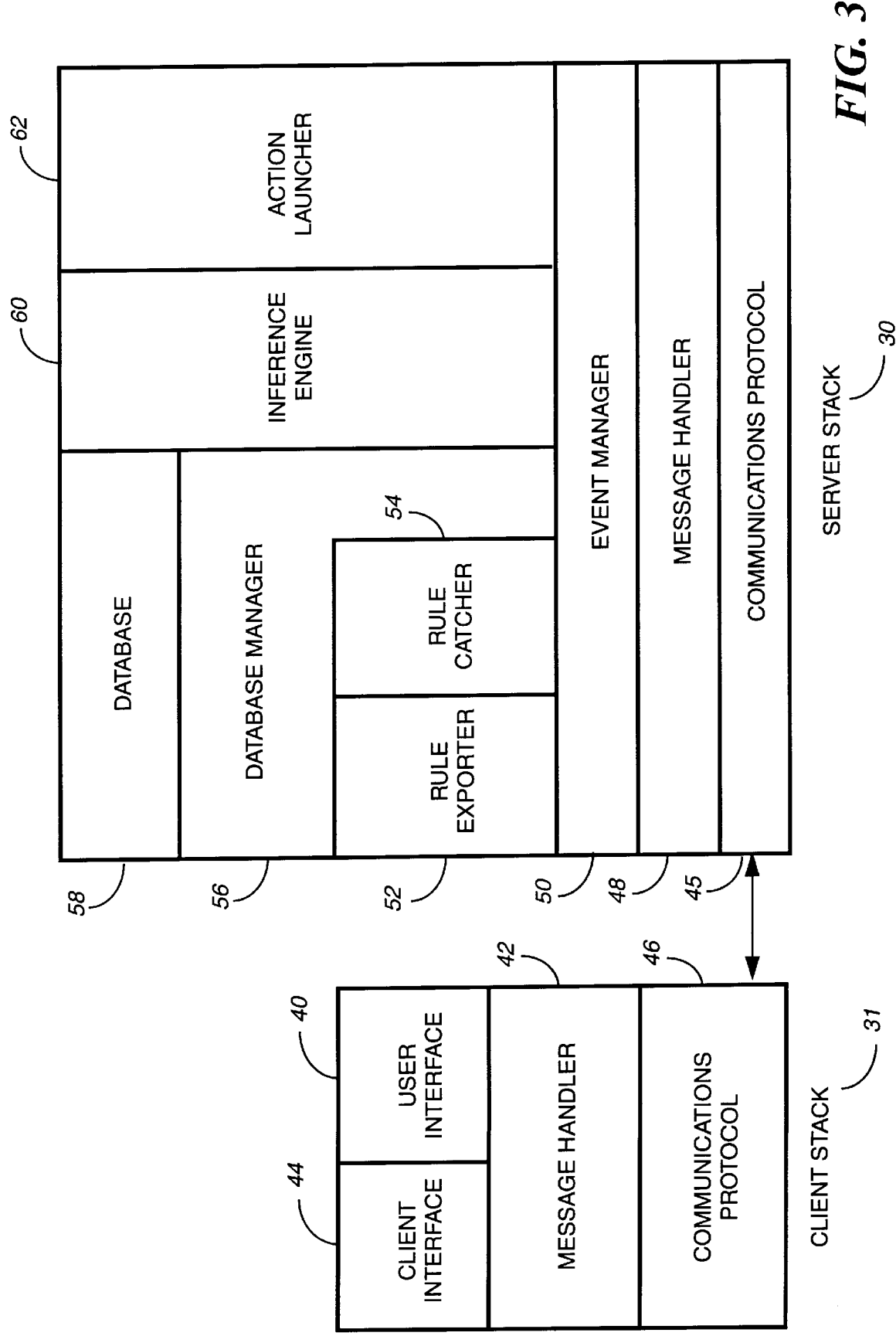
FIG. 3 illustrates a preferred form of the Agent of the present invention adapted for use in the client/server network of FIG. 2.

FIG. 3 illustrates certain software components of a preferred form of the intelligent Agent in stacks 30, 31 of the present invention which interact to handle e-mail messages, create a record of actions automatically taken by the Agent for each message, and inject that record into the body of the message itself.

Thus, FIG. 3 shows a server stack 30 and a client stack 31 that utilizes the client interface 44 stored in main memory 22 of network server 20 (FIG. 2). A client stack (not shown) similar to client stack 31 is stored in the main memory of each of the PCs 27 and 28 and utilizes the user interface 40 during normal operation of the network. In the following description, the same component numbers will be used for both client stacks with the storage location of the component being identified, i.e., in a PC memory or in the server memory.

The server stack 30 includes the following software components: communications protocol 45, message handler 48, event manager 50, rule exporter 52, rule catcher 54, database manager 56, database 58, inference engine 60, and action launcher 62.

The client stack 31 includes software components communications protocol 46, message handler 42, user interface 40 and client interface 44.

User interface 40 in each client PC 27, 28 formats the existing rules and templates for rules to be viewed and/or edited/created by a respective user. The user makes the association between triggers and actions. The user interface communicates with the message handler 42 by sending and receiving messages to store and retrieve the user's rules.

The client interface 44 in the server unit 20 is the point where applications notify the Agent that some event (trigger) has occurred for a user.

The communications protocol 45, 46 is the software layer where transmission from one stack to another stack occurs. It could be one of many means well known in the art, such as a Transmission Control Protocol/Internet Protocol (TCP/IP) stack or pipes or RPC or any other means for one process running in a computer to talk to another process running on either the same or some other computer.

The message handlers 42, 48 have two responsibilities. The first is to receive streams of data from its counterpart in other stacks and prepare them into messages to be passed up to the next software level. The second is to convert a message into a stream to pass over the network communications line 29 to its counterpart in another stack.

There are basically two types of events handled by the event manager 50. They are rules requests and trigger event notification. When a trigger event is received for a user, the event manager 50 utilizes the database manager 56 to retrieve the rules of the user for whom this event is handled. It then invokes the inference engine 60 to determine if the antecedent of any rules are true. For any rules whose antecedent is true, the corresponding consequences (actions) are placed in an action list. Upon the completion of inferencing, the event manager 50 invokes the action launcher 62 to execute any actions found in the action list. The initiating object is also passed to the action launcher 62 so that it may update it with the actions that are taken.

Rules requests fall into two categories; retrieve rules and store rules. For retrieving rules, the event manager 50 interacts with the rule exporter 52 to get the rules from the database 58 via the database manager 56 and subsequently send them to the requesting client via the client stack 31 in the appropriate PC 27, 28 main memory. For storing rules, the event manager 50 interacts with the rule catcher 54 to have the rules persistently stored in the database 58.

The rule exporter 52 utilizes the database manager 56 to retrieve the persistently stored rules. It then converts the rules from their internal format (objects) to their external format (sentences) so that the user interface 40 will be able to display the rules to the user.

The rule catcher 54 converts the rules from their external format (sentences) to the internal formats (objects). It then utilizes the database manager 56 to store the rules persistently.

The database manager 56 provides a database independent application programming interface (API) to its clients (rule exporter 52; rule catcher 54, and event manager 50). It interfaces with the database 58 to store rules persistently.

The database 58 is the persistent repository for the user's rules.

The inference engine 60 executes the antecedent of the rules to determine if the consequence should occur. If the antecedent is true, the actions in the corresponding rules consequence are placed in a list.

Each action in the list that is passed by event manager 50 to the action launcher 62 is executed. Then, an Agent activity record is added to the event initiating object by action launcher 62.

The interaction of these software components will be further explained by means of the following example. Today, a common usage of intelligent Agents is to automatically handle electronic mail (e-mail) for a person. Rules can be established of the form "If mail arrives from my boss, then page me, fax it to my secretary, and store it in the MyBoss folder," i.e., antecedent and consequence. With the intelligent Agent of FIG. 3 residing on a server 20, this type of activity is possible as the client hardware 27, 28 is not involved and does not even have to be powered on.

There are standards that are well known in the art that define how an e-mail should be comprised. RFC 822 (standard for the format of ARPA Internet Text Messages) specifies a syntax for text messages sent among computer users within the framework of "electronic mail." It defines a message representation protocol which specifies considerable detail about message headers, but which leaves the message content, or message body, as flat ASCII text.

RFC 1341 (MIME—Multipurpose Internet Mail Extension) redefines the format of message bodies to allow multi-part textual and non-textual message bodies to be represented and exchanged without loss of information. In particular, it is designed to provide facilities to include multiple objects in a single message.

In order to establish the aforementioned rule at his intelligent Agent in stack 30 from his PC 27, a user (Patrick) utilizes the user interface 40 of the client stack 31 to request his rules from the server stack 30 running on the network server 20. The user interface 40 in the client stack 31 running on Patrick's PC 27 passes the request down to the message handler 42 who in turn passes it down to the communications protocol 46 who sends the message to the communications protocol 45 running in the server stack 30 on the network server 20. The communications protocol 45 passes the request up to the message handler 48. The request is then sent up to the event manager 50 who interacts with the rule exporter 52 to retrieve the rules from the database 58 via the database manager 56. The event manager 50 then returns the rules by passing them back down to the message handler 48 who in turn passes it down to the communications protocol 45. The communications protocol 45 passes the rules to the communications protocol 46 running in the client stack 31 of Patrick's PC 27. The communications protocol 46 then passes the rules up to the message handler 42 who passes them up to the user interface for Patrick to create/modify the rules.

When Patrick is satisfied with his rules, he sends them to his intelligent Agent in stack 30 from his PC 27 via the user interface 40 of the client stack 31 to store his rules on the server stack 30 running on the network server 20. The user interface 40 in the client stack 31 running on Patrick's PC 27 passes the request down to the message handler 42 who in turn passes it down to the communications protocol 46 who sends the message to the communications protocol 45 running in the server stack 30 on the network server 20. The communications protocol 45 passes the request up to the message handler 48. The request is then sent up to the event manager 50 who interacts with the rule catcher 54 to store the rules in the database 58 via the database manager 56.

Now, when Patrick's boss sends an e-mail message from his PC 28 to the network server 20, the mail server software (not shown) running on the network server 20 receives the e-mail message for Patrick. The mail server software sends the e-mail message to Patrick's Agent via the client interface 44 in the client stack 31 running in the network server 20 main memory 22. When the intelligent Agent in server stack 30 receives the e-mail message (this is the trigger) the message handler 48 retrieves the rules from the database 58 via the database manager 56. The message handler 58 then invokes the inference engine 60 to inference on the rules.

Since the antecedent of the rule is true (mail arrives from my boss), the inference engine 60 places the consequences (page me with "Mail from the boss has arrived," fax it to my secretary, and store it in the MyBoss folder) into a list. Since there are no other rules, the inference engine 60 quiesces and control is returned to the event manager 50. Recognizing that there are actions in the list to perform, the event manager 50 invokes the action launcher 62. The action launcher 50 executes the actions (page me with "Mail from the boss has arrived," fax it to my secretary, and store the mail to my MyBoss). The action launcher 62 appends to the arriving e-mail another body part that shows the actions that were taken by the intelligent Agent on this e-mail. This is specified with the content-type of text as specified in RFC 1341.

When the action launcher 62 finishes, the event manager 50 sends the updated e-mail message back to the requesting client (e-mail software) via the message handler 48 and communications protocol 45 on the server stack 30 in the network server 20 main memory 22 and the communications protocol 46, message handler 42, and client interface 44 that are also in the main memory 22 of network server 20.

Patrick receives the page and powers up his client PC 27 to access the network server 20 for his e-mail messages. He then opens the e-mail message from his boss, and sees in the e-mail message that the page was sent to his pager, the fax was sent to his secretary, and the mail was stored to the MyBoss folder by simply reading the e-mail message.

Figure 4:
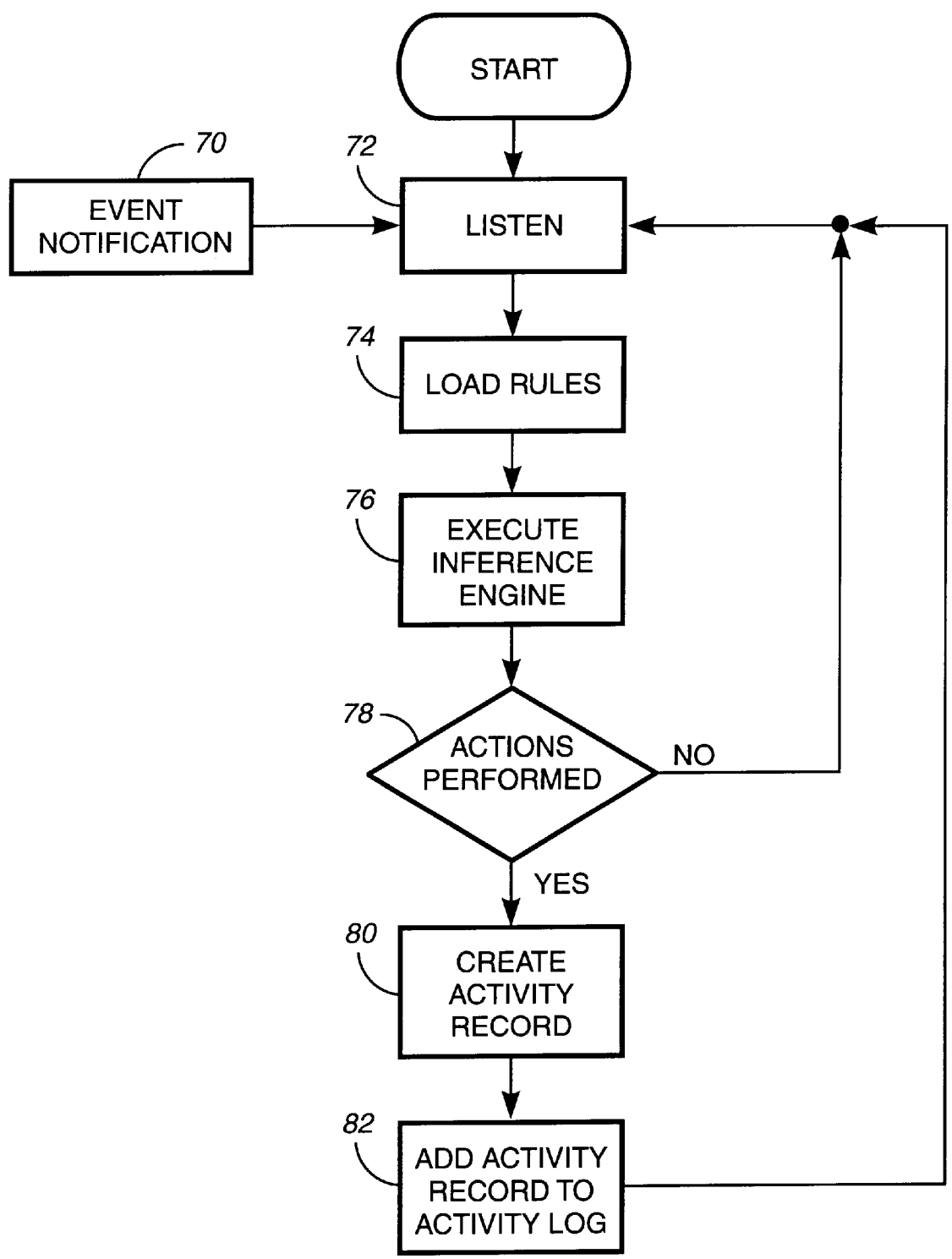
FIG. 4 is a flow chart of a prior art method of handling records of Agent activity.

The flowchart of FIG. 4 illustrates a prior art method of handling e-mail messages with an intelligent Agent. When the mail server software running in the main memory 22 of network server 20 receives an e-mail message, it creates a trigger (that contains the e-mail message), or event notification block 70, and sends it to the intelligent Agent that is the server stack 30 running in the main memory 22 of network server 20. The communications protocol 45 is listening, block 72, for messages and receives it. It passes the message up through the message handler 48 to the event manager 50 who loads the rules, block 74, from the database 58 via the database manager 56. The inference engine 60 is executed at block 76. If necessary, the action launcher 62 is invoked to execute any actions that the inference engine 60 may have added to the actions list. At block 78, if the event manager detects that actions have not been added to the action list, it quiesces and the communications protocol 45 goes back to listening for messages at block 72. If, on the other hand, the event manager 56 detects that actions have been added to the action list, it creates an activity record at block 80, showing any actions that were taken. At block 82, the event manager 50 then adds this record to the activity log in the database 58 via the database manager 58. Once this is completed, the communications protocol 45 goes back to the listen state at block 72.

Figure 5:
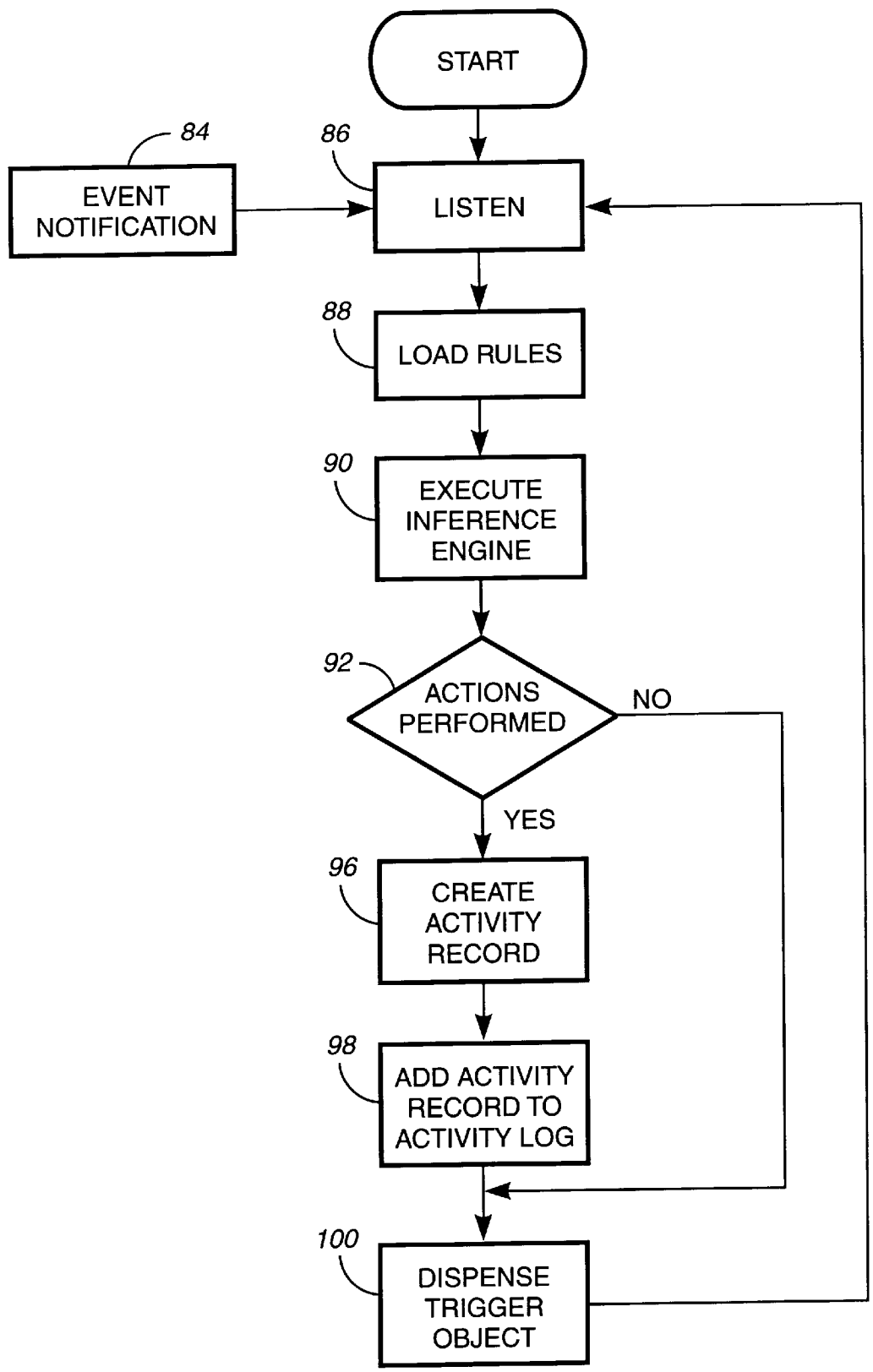
FIG. 5 is a flow chart illustrating the improved method of the present invention for handling the recording of Agent activity.

FIG. 5 is a flowchart illustrating the improved method of the present invention in which actions, automatically performed by an intelligent Agent on a data object received thereby for processing, are recorded (injected into) in the body of the object.

When a data object (such as an e-mail message) is to be routed to a user at PC 27 from PC 28, the software running on PC 28 creates a trigger (that contains the data object), event notification block 84, and sends it to the intelligent Agent that is the server stack 30 running in the main memory 22 of network server 20. The communications protocol 45 is listening, block 86, for messages and receives it. It passes the message up through the message handler 48 to the event manager 50 who loads the rules, block 88, from the database 58 via the database manager 56. The inference engine 60 is executed at block 90. If necessary, the action launcher 62 is invoked to execute any actions that the inference engine 60 may have added to the actions list. At block 92, if the event manager detects that actions have not been added to the action list, it sends the data object to PC 27 via the message handler 48 and communications protocol 45 at block 98. If, on the other hand, the event manager 56 detects that actions have been added to the action list, it creates an activity object at block 94, showing any actions that were taken. At block 96, the event manager 50 then adds this object to the triggering object. At block 98, the event manager 50 sends the updated data object via the message handler 48 and communications protocol 45 to the destination PC 27. Once this is completed, the communications protocol 45 goes back to the listen state at block 86.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. In a computer network comprising at least one server unit and a plurality of remote stations; at least some of which are adapted to send and receive electronic mail messages a data processing system comprising:

an Agent responsive to the receipt of a mail message from one of said stations and intended for delivery to a user for processing the message in accordance with a set of rules provided to the Agent by the user;

said Agent comprising means for inserting into the message a self-contained action record of the actions taken by the Agent on behalf of the user in accordance with said rules; and for sending the message with its self-contained action record to the user at a predetermined destination station.

2. In a data processing system of the type in which data objects are routed to an Agent for processing of said objects automatically in accordance with a set of rules provided by a user to the Agent the Agent being responsive to triggers associated with said set of rules, a method comprising:

routing a data object to the Agent for processing;

notifying the Agent of the routing of said object by means of an associated trigger;

accessing an associated set of operation rules for the Agent to execute for processing said object;

processing said object in accordance with said set of rules;

creating a self-contained activity record specifying actions taken by the Agent to process said record in accordance with said rules; and adding the self-contained activity object to said data object.

3. The method of claim 2 wherein the step of creating an activity record comprises creating an activity record object and the step of adding the activity record comprises adding the activity record object to said data object.

4. A data processing system of the type in which a data object is routed to an Agent for processing of said object automatically in accordance with a set of rules provided by a user for use by the Agent, the Agent being responsive to a trigger associated with said set of rules, comprising:

means for routing the data object to the Agent for processing;

means for receiving an associated trigger for notifying the Agent of the routing of said data object to the Agent;

means for accessing an associated set of operation rules for the Agent to execute for processing said object; and means for injecting a self-contained activity record with a record of actions automatically taken by the Agent for each message into said data object.

5. The data processing system of claim 4 wherein the means for injecting is effective for adding the activity object to the front end or back end of the data object.

6. The data processing system of claim 5 wherein the data object is an electronic mail message, and wherein the activity object is at the front end of the message and may be viewed prior to content data of the message.

7. The data processing system of claim 4 further comprising the Agent.

8. An article of manufacture comprising:

a computer usable medium having computer readable program code means embodied therein for causing a record of actions, taken with respect to an electronic mail message by an intelligent Agent in accordance with a set of rules given to the Agent by a user, to be interjected into the message for the user when receiving the message, the computer readable program code means in said article of manufacture comprising:

computer readable program code means for causing a computer to route an electronic mail message to the intelligent Agent for processing;

computer readable program code means for causing the computer to notify the Agent of the routing of the message to the Agent;

computer readable program code means for causing the computer to access rules for processing the message;

computer readable program code means for causing the computer to create a self-contained record of actions taken by the computer to process the message; and computer readable program code means for causing the computer to insert the self-contained record of actions taken into the message.

9. The article of manufacture of claim 8 wherein the last-mentioned computer readable program code comprises instructions for inserting the record of actions taken into the front end of the message prior to a main message body content.

10. An article of manufacture comprising:

a computer usable medium having computer readable program code means embodied therein for causing a record of actions, taken with respect to a data object by an intelligent Agent in accordance with an associated set of rules given to the Agent by a user, to be interjected into the data object for the benefit of the user when reviewing the data object, the computer readable program means in said article of manufacture comprising:

computer readable program code means for causing a computer to route a data object to the intelligent Agent for processing, computer readable program code means for causing the computer to notify the Agent of the routing of the data object to the Agent, computer readable program code means for causing computer to process the data object in accordance with said rules, computer readable program code means for causing the computer to create a self-contained record of actions taken by the computer to process the data object, and computer readable program code means for causing the computer to insert the self-contained record of actions taken into the data object.

* * * * *